United States Patent
Fryer et al.

[15] 3,691,157
[45] Sept. 12, 1972

[54] PREPARATION OF 7-SUBSTITUTED-1-(2-DIETHYLAMINOETHYL)-5-(2-HALOPHENYL)-1,3-DIHYDRO-2H-1,4-BENZODIAZEPIN-2-ONES

[72] Inventors: Rodney Ian Fryer, 5 Eton Drive, North Caldwell; Leo Henryk Sterbach, 10 Woodmont Road, Upper Montclair, N.J. 07043

[22] Filed: Aug. 12, 1970

[21] Appl. No.: 63,273

Related U.S. Application Data

[63] Continuation-in-part of Ser. No. 733,817, June 3, 1968, abandoned.

[52] U.S. Cl......260/239.3 D, 260/562 N, 260/562 P, 260/570 AB, 260/326 D, 260/326 N, 260/999
[51] Int. Cl. ............................................C07d 53/06
[58] Field of Search..................260/239.3 D, 570 AB

[56] References Cited

UNITED STATES PATENTS

| | | |
|---|---|---|
| 3,192,199 | 6/1965 | McMillan et al....260/239.3 D |
| 3,221,050 | 11/1965 | McMillan et al....260/239.3 D |
| 3,284,503 | 11/1966 | McMillan et al....260/239.3 D |
| 3,299,053 | 1/1967 | Archer et al........260/239.3 D |
| 3,304,313 | 2/1967 | McMillan et al....260/239.3 D |
| 3,371,085 | 2/1968 | Reeder et al........260/239.3 D |
| 3,391,138 | 7/1968 | Archer et al........260/239.3 D |
| 3,510,517 | 5/1970 | Richter et al........260/570 AB |

FOREIGN PATENTS OR APPLICATIONS

| | | |
|---|---|---|
| 204,435 | 8/1939 | Switzerland.........260/570 AB |
| 206,612 | 11/1939 | Switzerland.........260/570 AB |
| 206,613 | 11/1939 | Switzerland.........260/570 AB |

*Primary Examiner*—Henry R. Jees
*Assistant Examiner*—Robert T. Bond
*Attorney*—Samuel L. Welt, Jon S. Saxe, Bernard S. Leon, William G. Isgro and Margaret C. Bogosian

[57] ABSTRACT

7-Substituted-1-(2-diethylaminoethyl)-5-(2-halophenyl)-1,3-dihydro-2H-1,4-benzodiazepin-2-ones are prepared starting with a 4-substituted-2-(2-halobenzoyl)aniline by a multi-step procedure. The product compounds produced by the process of the present invention are useful as tranquillizers, muscle relaxants, anti-convulsants and hypnotics.

6 Claims, No Drawings

PREPARATION OF 7-SUBSTITUTED-1-(2-DIETHYLAMINOETHYL)-5-(2-HALOPHENYL)-1,3-DIHYDRO-2H-1,4-BENZODIAZEPIN-2-ONES

RELATED APPLICATIONS

This application is a continuation-in-part application of Ser. No. 733,817 filed on June 3, 1968, now abandoned.

DETAILED DESCRIPTION OF THE INVENTION

The present invention relates to a process for the preparation of compounds of the general formula:

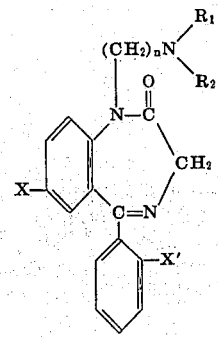

I wherein $R_1$ and $R_2$ are lower alkyl, X and X' are hydrogen, halogen and trifluoromethyl and $n$ is an integer from 2 to 5 by a multi-step synthesis starting with compounds of the general formula:

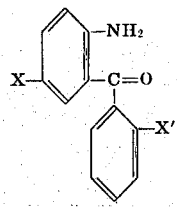

II where X and X' are as above.

The initial step in the above described synthesis involves reacting a compound of the formula II above with a haloalkanoyl halide represented by $YCO(CH_2)_{n-1}Y$, where Y is halogen, e.g., bromoacetyl bromide, to produce a compound of the formula III below:

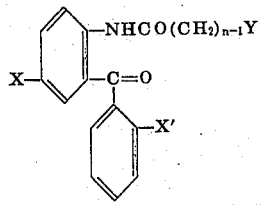

III where X, X' and n are as above and Y is halogen.

The compound of formula III above is then treated with a di-lower alkylamine represented by $HNR_1R_2$ where $R_1$ and $R_2$ are lower alkyl such as, for example, dimethyl amine, diethyl amine, etc., to form a compound of the formula IV below:

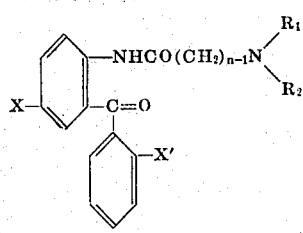

IV where X, X', $n$, $R_1$ and $R_2$ are as above.

The next reaction step of the present process involves the simultaneous reduction of both carbonyl functions in the compounds of formula IV above utilizing a chemical reducing agent, e.g., lithium aluminum hydride, so as to produce a compound of the formula:

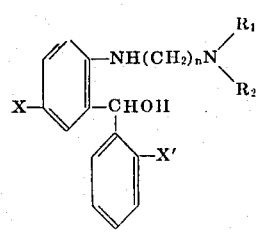

V where X, X', $n$, $R_1$ and $R_2$ are as above.

The compounds of formula V are then treated with a selective oxidation agent so as to reconvert the hydroxyl group to a ketone function. Suitable oxidation agents for this purpose include, for example, $MnO_2$, $C_rO_3$, $SeO_2$, AgO, and the like.

The resulting product from the aforesaid oxidation reaction corresponds to compounds having the following formula:

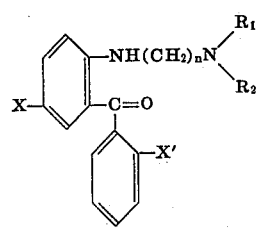

VI where X, X', $n$, $R_1$ and $R_2$ are as above.

Compounds of formula VI above are treated with phthalimidoacetyl chloride to produce a compound of formula VII below:

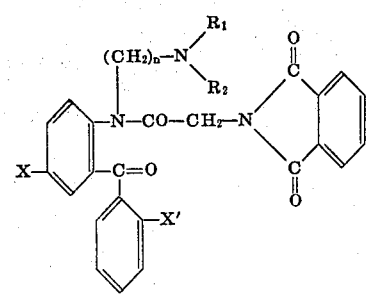

VII where X, X', $n$, $R_1$ and $R_2$ are as above.

In a final step of the present reaction sequence, the phthaloyl group is removed and the intermediate cyclized to form a benzodiazepine ring structure. The removal of the phthaloyl group is effected by treatment with hydrazine and the cyclization occurs in situ to form compounds of the formula I above.

In order to more clearly indicate the reaction sequence to which the present invention is directed, the following reaction scheme is provided. In this reaction scheme, the meanings of X, X', $n$, $R_1$, $R_2$ and Y are as above throughout.

Reaction scheme

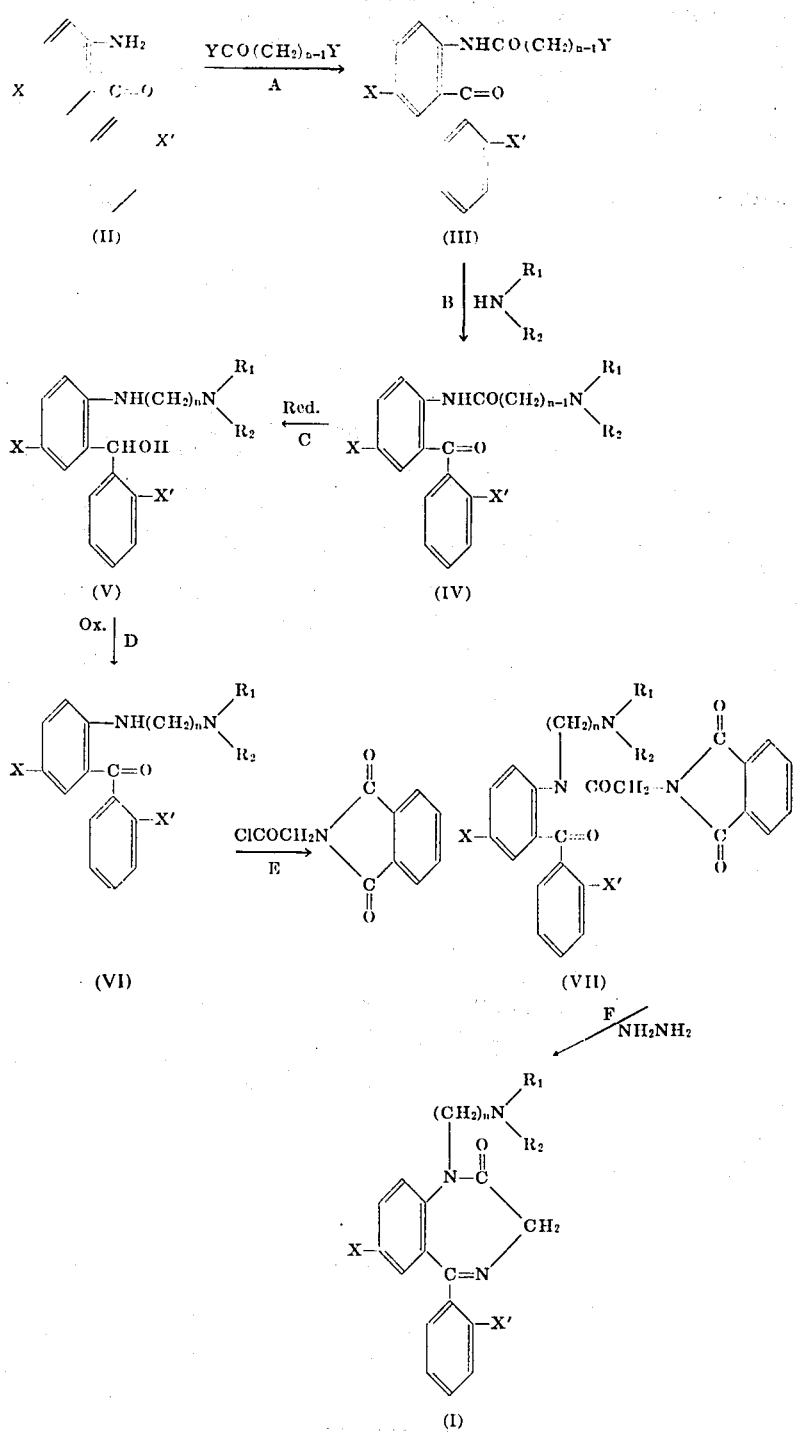

The reaction conditions and selection of solvents for each of the respective reactions identified in the above reaction scheme by a capital letter under the corresponding arrow are summarized below in Table I. Reaction conditions include both operative values and preferred ranges. Similar designations for operative and preferred are given for the solvents useful in each of the enumerated reactions.

TABLE I

| Reaction | Reaction Conditions | | Solvents | |
|---|---|---|---|---|
| | Operative | Preferred | Operative | Preferred |
| A | below room temp. to reflux temp. of solvent | 50°–80° | any inert organic solvent | Benzene |

| | | | | |
|---|---|---|---|---|
| B | below room temp. at atmospheric to 160° in an autoclave | 20°–30° | any inert organic solvent | Dichloromethane |
| C | room temp. to reflux temp. of solvent | 35°–80° | any ether such as ethyl ether butylether tetrahydrofuran | Tetrahydrofuran |
| D | −10° to 100° | at or about room temp. (23°) | any inert solvent | Chloroform Acetic acid |
| E | room temp. to reflux temp. of solvent | 60°–80° | any inert organic solvent | Tetrahydrofuran Benzene |
| F | −10° to reflux temp. of solvent | at or about room temp. | any inert organic solvent | Ethanol Chloroform |

All temperatures are in degrees Centigrade

In preferred aspects of the present invention, Y in the formula representations above is bromine or chlorine. In a further preferred aspect of the present invention, X and X' are each halogen, $n$ is 2 and $R_1$ and $R_2$ each correspond to an ethyl group. In a most preferred embodiment of the present invention, Y is bromine, X is chlorine, X' is fluorine, $n$ is 2 and $R_1$ and $R_2$ are each ethyl as above. Thus, the desired end product of the present process in its most preferred embodiment may be represented by the following formula:

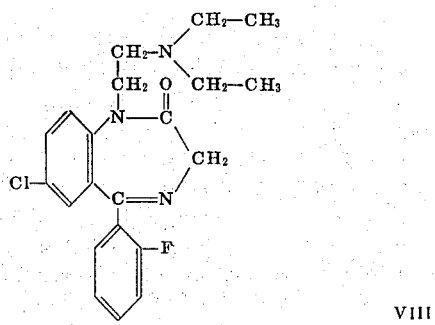

VIII

The term "lower alkyl" as used herein is meant to include both straight and branched chain groups having from one to seven, preferably one to four carbon atoms. Examples of representative lower alkyl groups include methyl, ethyl, propyl and isopropyl. The term "halogen," as used throughout the present disclosure, is intended to connote all four halogens, namely, chlorine, bromine, iodine, and fluorine, unless otherwise specified.

It has thus been demonstrated that the process of the present invention is useful in preparing compounds which correspond to general formula I above. Such compounds have been shown in the art to exhibit important pharmaceutical activity, particularly with reference to their use as tranquillizers, muscle relaxants, anti-convulsants and hypnotics. An example of a typically effective compound in this series is represented by the compound of formula VIII above, i.e., 7-chloro-1-(2-diethylaminoethyl)-5-(2-fluorophenyl)-1,3-dihydro-2H-1,4-benzodiazepin-2-one.

The present invention may be more clearly understood with reference to the following samples which are presented for the sake of illustration and are not meant to limit the scope of the present invention in any manner. All temperatures in these examples are in degrees Centigrade.

EXAMPLE 1

Preparation of 4'-Chloro-2-diethylamino-2'-(2-fluorobenzoyl)-acetanilide

A solution of 75 g. (0.202 m) of 2-bromo-4'-chloro-2'-(2-fluorobenzoyl)acetanilide in 325 ml. of dichloromethane was treated with 17.7 g. (0.242 m) of diethylamine. After standing overnight at room temperature another 17.7 g. of diethylamine was added and the mixture was allowed to stand for an additional 2.5 hours. The solution was washed with 500 ml. of water, 200 ml. of saturated brine solution, stirred with charcoal and anhydrous sodium sulfate, filtered and evaporated to dryness.

The residual oil was dissolved in 150 ml. of benzene and filtered through 400 g. of Fluorisil. The product was eluted with benzene followed by ether. The ether fraction was concentrated and the product recrystallized from ether, and the from a mixture of ether and petroleum ether to give the above-titled compound as white prisms, melting point 48°–59°. The benzene fraction was evaporated to give additional product as an oil, which was not further purified but used directly in the subsequent steps.

EXAMPLE 2

Preparation of 5-Chloro-2-(2-diethylaminoethylamino)-2'-fluorobenzhydrol

A solution of 8.7 g. (0.229 m) of lithium aluminum hydride in 200 ml. of dry tetrahydrofuran under nitrogen was cooled in an ice bath and treated by the dropwise addition of a solution of 55.6 g. (0.153 m) of 4'-chloro-2-diethylamino2'-(2-fluorobenzoyl)acetanilide in 150 ml. of dry tetrahydrofuran. The reaction was stirred overnight at room temperature and then heated under reflux for one hour. An additional 5.8 g. (0.153 m) of lithium aluminum hydride was added and the reaction mixture was heated under reflux for one hour, cooled to room temperature when excess reagent was decomposed with 10 ml. of water. A saturated solution of sodium bicarbonate was added until the emulsion coagulated. The precipitate was removed by filtration over Celite and washed with dichloromethane. The filtrates were combined and evaporated to dryness to give the above-titled compound as an oil, which was used without further purification in subsequent reactions.

EXAMPLE 3

Preparation of 5-Chloro-2-(2-diethylaminoethylamino)-2'-fluorobenzophenone

A solution of 5 g. (0.142 M) of 5-chloro-2-(2-diethylaminoethylamino)-2'-fluorobenzhydrol in 125 ml. of xylene was treated with 6.1 g. (0.071 M) of manganese dioxide and the mixture was stirred and refluxed for 6 hours. The solution was filtered and distilled to dryness under reduced pressure.

The residual oil was dissolved in 15 ml. of benzene and chromatographed on 150 g. of silica gel. The column was eluted first with 500 ml. of benzene and 500 ml. of dichloromethane. Both fractions were discarded and then the column was eluted with 300 ml.

of ether. The ether fraction was treated with an excess of ethanolic hydrogen chloride, distilled to dryness and the residual oil was crystallized from a mixture of isopropanol and ether to give the above-named product as yellow needles, m.p. 130°–138°.

EXAMPLE 4

Preparation of 4'-Chloro-2'-(2-fluorobenzoyl)-N-(2-diethylaminoethyl)-2-phthalimidoacetanilide hydrochloride A solution containing 4 g. (0.0114 m) of 5-chloro-2-(2-diethylaminoethylamino)-2'-fluorobenzophenone and 5 g. (0.0228 m) of phthalimidoacetyl chloride in 50 ml. of tetrahydrofuran was heated under reflux for 17 hours, and then evaporated to dryness. The residue was made basic with a sodium bicarbonate solution, and the product was extracted into dichloromethane (3 × 100 ml.). The organic layers were combined, washed with 100 ml. of saturated brine, dried over anhydrous sodium sulfate and evaporated to dryness.

The oil was dissolved in 100 ml. of benzene and an excess of ethanolic hydrogen chloride was added, and the resulting solution was evaporated to dryness under vacuum. The salt was crystallized from isopropanol, and then from a mixture of methanol and ether to give the above-titled product as white prisms, melting point 268°–274° (sealed tube).

EXAMPLE 5

Preparation of 7-Chloro-1-(2-diethylaminoethyl)-5-(2-fluorophenyl)-1,3-dihydro-2H-1,4-benzodiazepin-2-one A solution of 2 g. (0.0037 m) of 4'-chloro-2'-(2-fluorobenzoyl)-N-(2-diethylaminoethyl)-2-phthalimidoacetanilide in 30 ml. of ethanol and 30 ml. of chloroform was treated with 0.55 g. (0.11 m) of hydrazine hydrate, and the solution was allowed to stand for 17 hours. The reaction mixture was evaporated to dryness, made basic with 100 ml. of dilute ammonium hydroxide and extracted with ether (2 × 200 ml.). The ether layers were combined and extracted with 150 ml. of 5percent hydrochloric acid, which was then made basic with ammonium hydroxide and extracted with 200 ml. of ether. The ether layer was washed with saturated brine, dried over anhydrous sodium sulfate and evaporated to dryness. The residual oil was crystallized from a mixture of ether and petroleum ether to give the above-titled product as white rods, melting point 80°–84°.

We claim:

1. A process for the preparation of compounds of the formula:

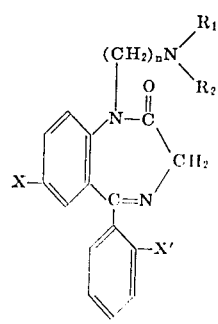

wherein $R_1$ and $R_2$ are lower alkyl, X and X' are hydrogen, halogen and trifluoromethyl and $n$ is an integer from 2 to 5 which process comprises the following steps in combination:

A. reacting a compound of the formula:

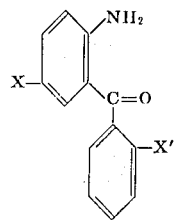

where X and X' are as above with a haloalkanoyl halide;

B. reacting the product from (A) above with a lower dialkyl amine;

C. reducing carbonyl functions in the product of (B) above with lithium aluminum hydride to yield a benzhydrol compound;

D. treating the aforesaid benzhydrol with a selective oxidation agent selected from the group consisting of manganese dioxide and chromic acid to produce the corresponding benzophenone;

E. reacting the above benzophenone with phthalimidoacetyl chloride; and

F. treating the phthalimidoacetyl derivative with hydrazine to effect removal of the phthaloyl group and cyclization to a benzodiazepine ring structure.

2. The process of claim 1 wherein said halo alkanoyl halide of step (A) above is bromoacetyl bromide.

3. The process of claim 1 wherein said lower dialkyl amine of step (B) above is diethylamine.

4. The process of claim 1 wherein n has a value of 2 and X and X' are each halogen.

5. The process of claim 6 wherein X is chlorine and X' is fluorine.

6. The process of claim 1 wherein $n$ is 2, X is chlorine, X' is fluorine and $R_1$ and $R_2$ are each ethyl.

* * * * *

UNITED STATES PATENT OFFICE
CERTIFICATE OF CORRECTION

Patent No. 3,691,157                     Dated September 12, 1972

Inventor(s)    Rodney Ian Fryer and Leo Henryk Sternbach

It is certified that error appears in the above-identified patent and that said Letters Patent are hereby corrected as shown below:

No assignee in case should be assigned to Hoffmann-La Roche Inc.

Column 8, line 51 of Claim 5

"The process of claim 6"

should be

The process of claim 4

Signed and sealed this 1st day of May 1973.

(SEAL)
Attest:

EDWARD M. FLETCHER, JR        ROBERT GOTTSCHALK
Attesting Officer             Commissioner of Patents